US012147254B2

(12) United States Patent
Chen

(10) Patent No.: US 12,147,254 B2
(45) Date of Patent: Nov. 19, 2024

(54) VOLTAGE REGULATING CIRCUIT FOR KEEPING VOLTAGE HEADROOM

(71) Applicant: NOVATEK Microelectronics Corp., Hsin-Chu (TW)

(72) Inventor: Chun-Hung Chen, Yun-Lin County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 326 days.

(21) Appl. No.: 17/829,282

(22) Filed: May 31, 2022

(65) Prior Publication Data

US 2023/0384809 A1 Nov. 30, 2023

(51) Int. Cl.
*G05F 1/46* (2006.01)

(52) U.S. Cl.
CPC .............. *G05F 1/462* (2013.01); *G05F 1/468* (2013.01)

(58) Field of Classification Search
CPC ........... G05F 1/462; G05F 1/468; G05F 1/575
See application file for complete search history.

(56) References Cited

U.S. PATENT DOCUMENTS 10,185,338 B1 * 1/2019 Lahiri ................. H02M 3/1584
10,345,840 B1 * 7/2019 Cao ......................... G05F 1/575
2019/0235545 A1 8/2019 Zhang
2022/0397925 A1 * 12/2022 Tiruvamattur .......... G05F 1/567
2024/0210976 A1 * 6/2024 Nam ......................... G05F 1/56

FOREIGN PATENT DOCUMENTS

TW 201013355 4/2010
TW I479292 B 4/2015
TW I740663 B 9/2021

* cited by examiner

*Primary Examiner* — Jue Zhang
*Assistant Examiner* — Lakaisha Jackson
(74) *Attorney, Agent, or Firm* — Winston Hsu

(57) ABSTRACT

A voltage regulating circuit includes a low-dropout regulator, configured to provide a driving voltage to drive a loading circuit and receive a first detection voltage from a first feedback terminal; and a reference voltage generating circuit, coupled to the low-dropout regulator, configured to receive a second detection voltage from a second feedback terminal. A voltage difference between the first feedback terminal and the second feedback terminal is clamped according to the first detection voltage and the second detection voltage.

18 Claims, 12 Drawing Sheets

VOLTAGE REGULATING CIRCUIT FOR KEEPING VOLTAGE HEADROOM

BACKGROUND OF THE INVENTION

1. Field of the Invention

The present invention relates to a voltage regulating circuit, and more particularly, to a voltage regulating circuit capable of maintaining an operation voltage period of a loading by keeping enough headroom.

2. Description of the Prior Art

With the growth of the data transmission volume of mobile devices, demands for power consumption are increased. In addition, batteries with higher capacities cannot be utilized in the mobile devices for advanced processes with trends of slim-type mobile devices. However, with evolutions of the process, a core voltage of a digital logic circuit of an integrated chip (IC) is lowered. When an operating period of the digital logic circuit is decreased with a voltage drop, which is caused by a path impedance of the IC, the core voltage during the operation period is narrowed down, and causes logic abnormality in circuitry.

FIG. 1 is a schematic diagram of a conventional voltage regulating circuit 10 with a reference circuit 102 and a low-dropout regulator 104 for a loading circuit LC. In FIG. 1, a power path impedance $R_{APR\_PWR}$ and a ground path impedance $R_{APR\_GND}$ exit between the conventional voltage regulating circuit 10 and the loading circuit LC. Ideally, since a current $I_{APR}$ of the digital logic circuit DLC flows through the power path impedance $R_{APR\_PWR}$ and the ground path impedance $R_{APR\_GND}$ the current $I_{APR}$ is equal to a current $I_{PWR}$ or $I_{GND}$, if $R_{APR\_PWR}$ and $R_{APR\_GND}$ are small enough, then the power path impedance $R_{APR\_PWR}$ and the ground path impedance $R_{APR\_GND}$ can be ideally neglected.

However, the power path impedance $R_{APR\_PWR}$ and the ground path impedance $R_{APR\_GND}$ between the conventional voltage regulating circuit 10 and the loading circuit LC cannot be neglected practically. As such, a voltage difference between two terminals of the digital logic circuit DLC is affected because of an IR drop of the power path impedance $R_{APR\_PWR}$ and the ground path impedance $R_{APR\_GND}$. And IR drop is proportional to the path impedances, which narrows down the voltage operation range of the loading circuit LC.

Therefore, improvements are necessary to the conventional techniques.

SUMMARY OF THE INVENTION

In light of this, the present invention provides a voltage regulating circuit, which compensates a raised voltage and a dropped voltage generated by path impedances between the voltage regulating circuit and a loading circuit to keep enough headroom for operating the loading.

An embodiment of the present invention discloses a voltage regulating circuit comprises a low-dropout regulator, configured to provide a driving voltage to drive a loading circuit and receive a first detection voltage from a first feedback terminal; and a reference voltage generating circuit, coupled to the low-dropout regulator, configured to receive a second detection voltage from a second feedback terminal; wherein a voltage difference between the first feedback terminal and the second feedback terminal is clamped according to the first detection voltage and the second detection voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
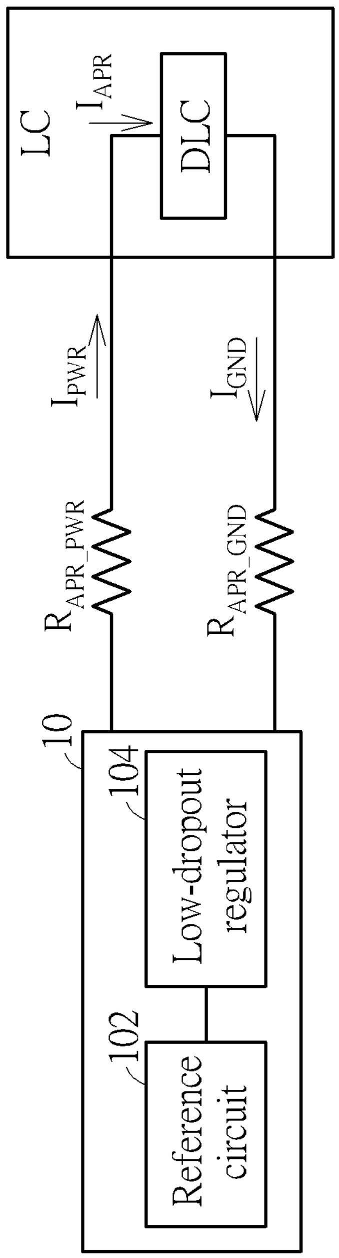
FIG. 1 PRIOR ART
FIG. 1 is a schematic diagram of a conventional voltage regulating circuit with a reference circuit and a low-dropout regulator for a loading circuit.
Figure 2:
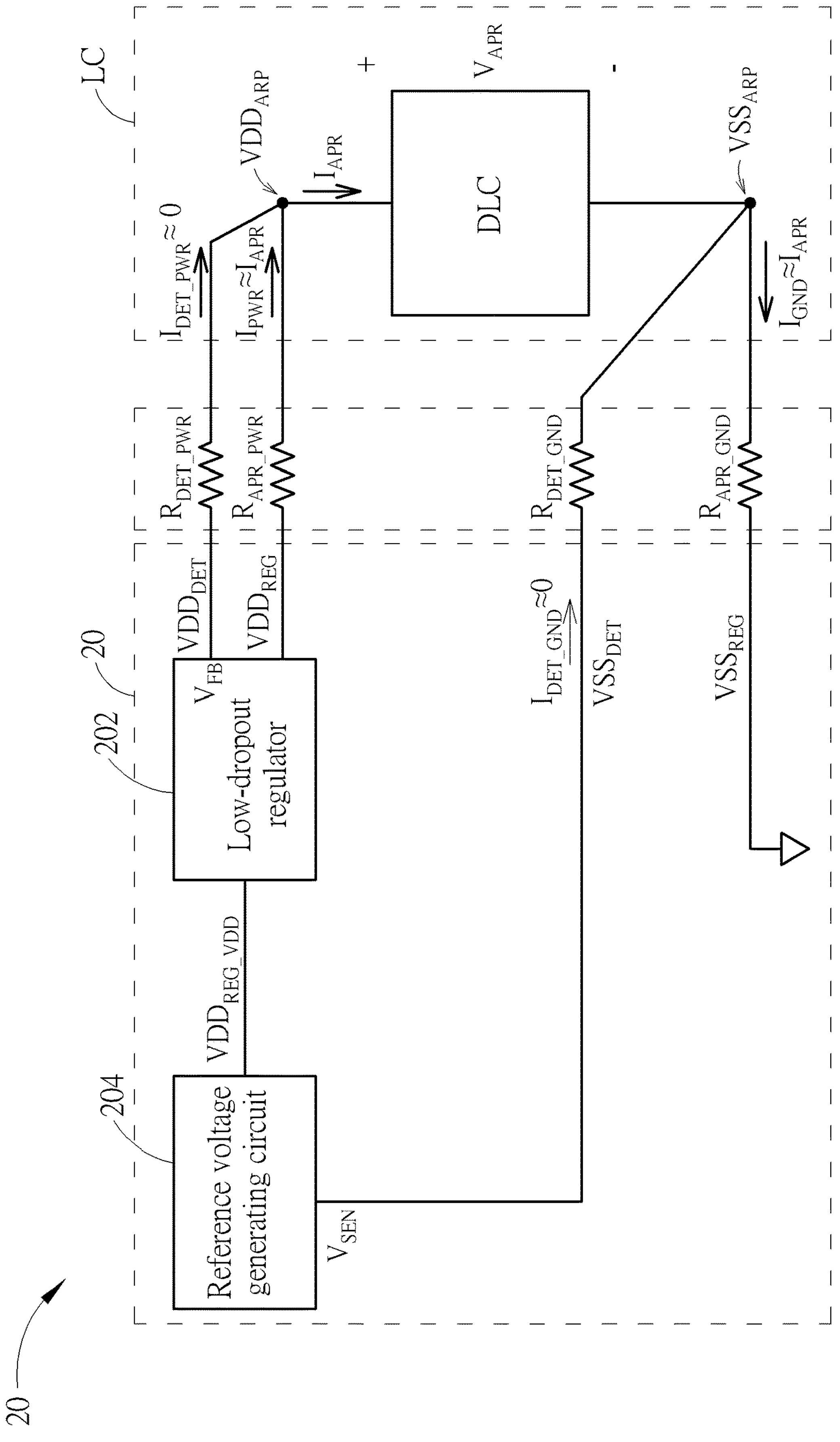
FIG. 2 is a schematic diagram of a voltage regulating circuit according to an embodiment of the present invention.

Please refer to FIG. 2, which is a schematic diagram of a voltage regulating circuit 20 according to an embodiment of the present invention. The voltage regulating circuit 20 includes a low-dropout regulator 202 and a reference voltage generating circuit 204, wherein the voltage regulating circuit 20 is configured to provide a stable output for a loading circuit LC. The low-dropout regulator 202 is configured to provide a driving voltage $VDD_{REG}$ to drive the loading circuit LC through a power path impedance $R_{APR\_PWR}$, and receive a first detection voltage $VDD_{DET}$ from a first feedback terminal $VDD_{APR}$. The reference voltage generating circuit 204 is configured to receive a second detection voltage $VSS_{DET}$ from a second feedback terminal $VSS_{APR}$ of the loading circuit LC. The reference voltage generating circuit 204 is coupled to the low-dropout regulator 202, wherein a voltage difference between the first feedback terminal $VDD_{APR}$ and the second feedback terminal $VSS_{APR}$ is clamped by the driving voltage $VDD_{REG}$ determined according to the first detection voltage $VDD_{DET}$ and the second detection voltage $VSS_{DET}$. A power detecting terminal $V_{FB}$ of the low-dropout regulator 202 is configured to receive the first detection voltage $VDD_{DET}$ and a ground detecting terminal $V_{SEN}$ of the reference voltage generating circuit 204 is configured to receive the second detection voltage $VSS_{DET}$.

Figure 3:
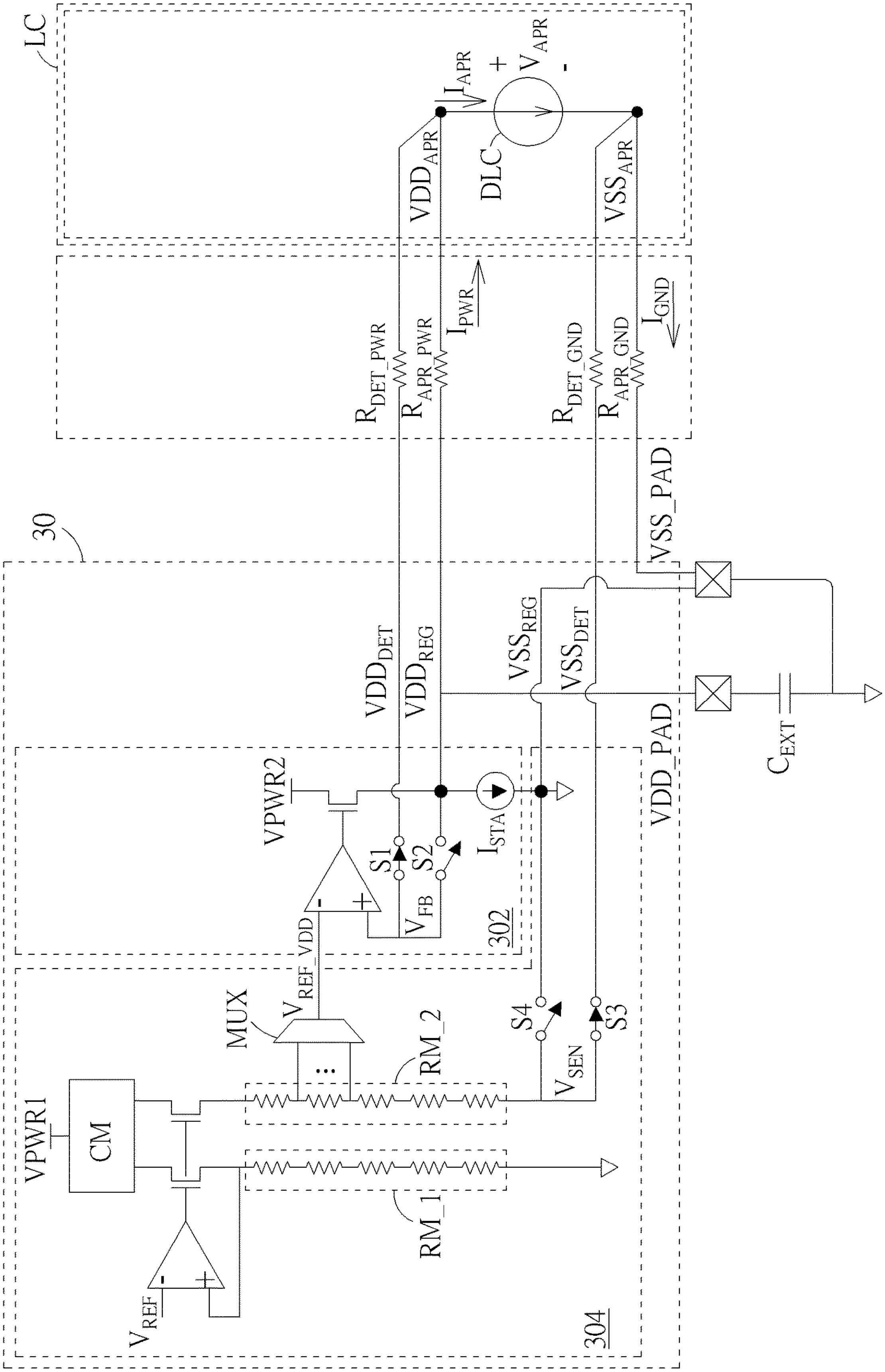
FIG. 3, FIG. 5, FIG. 7, FIG. 9 are schematic diagrams of a voltage regulating circuit according to an embodiment of the present invention.
Figure 4:
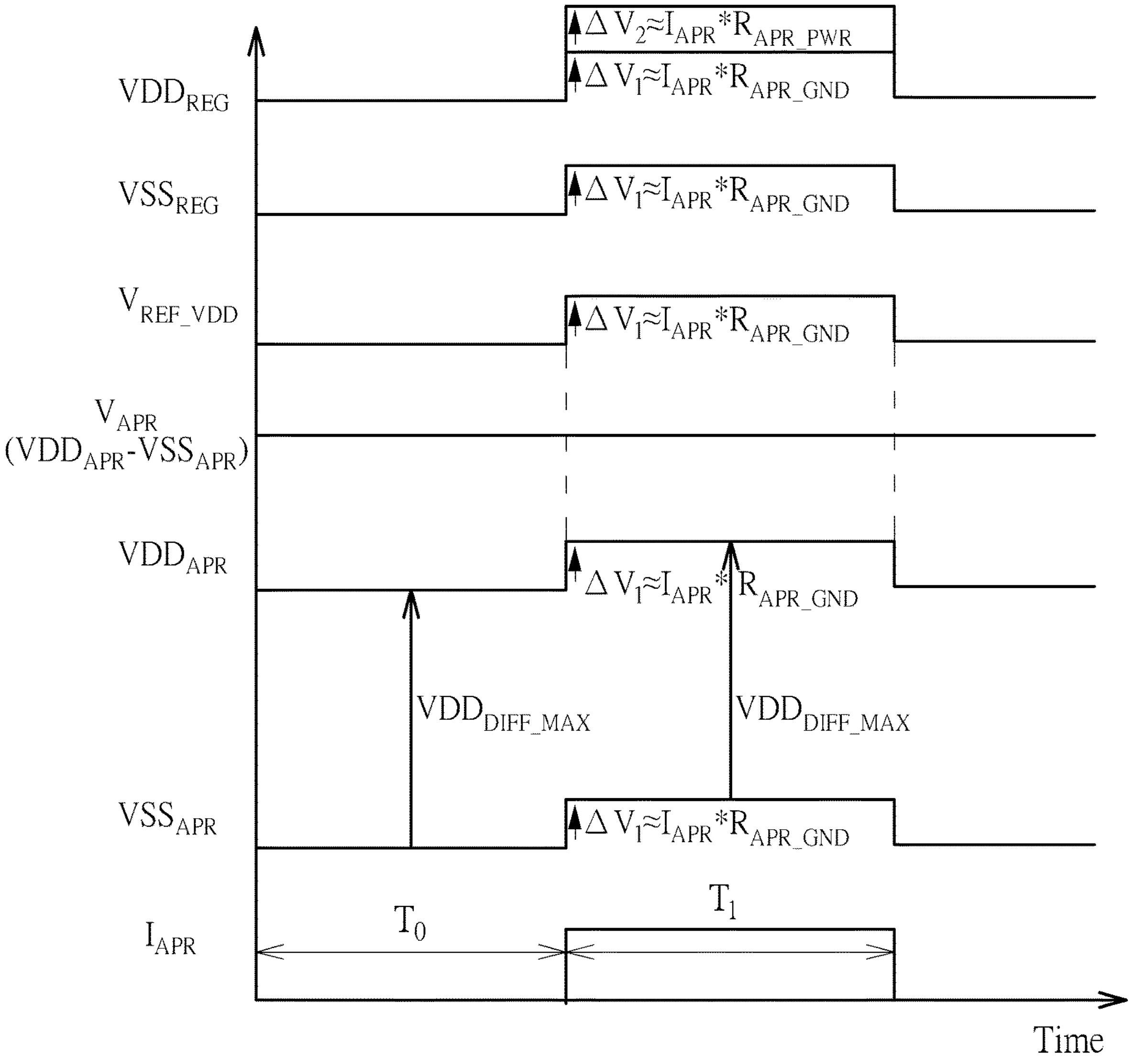
FIG. 4, FIG. 6, FIG. 8, FIG. 10 are schematic diagrams of waveforms of the voltage regulating circuit and a digital logic circuit in the configuration of FIG. 3, FIG. 5, FIG. 7 and FIG. 9 according to an embodiment of the present invention.

In detail, please refer to FIG. 3 and FIG. 4. FIG. 3 is a schematic diagram of a voltage regulating circuit 30 according to an embodiment of the present invention. FIG. 4 is a schematic diagram of waveforms of the voltage regulating circuit 30 and a loading circuit LC in the configuration of FIG. 3 according to an embodiment of the present invention.

The voltage regulating circuit 30 includes a low-dropout regulator 302 and a reference voltage generating circuit 304. The voltage regulating circuit 30 is configured to provide a stable output for the loading circuit LC. The low-dropout regulator 302 is configured to determine the driving voltage $VDD_{REG}$ to drive a loading circuit LC through a power path impedance $R_{APR\_PWR}$, and receive a first detection voltage $VDD_{DET}$ from a first feedback terminal $VDD_{APR}$. The driving voltage $VDD_{REG}$ is determined according to the received voltage of a power detecting terminal $V_{FB}$ and a reference voltage $V_{REF\_VDD}$, wherein the received voltage is the first detection voltage $VDD_{DET}$. The reference voltage generating circuit 304 includes a first resistor module RM_1, a second resistor module RM_2, a current mirror CM, and a multiplexer MUX. The current mirror CM is configured to reflect the current of the first resistor module RM_1 to the second resistor module RM_2 according to a first input voltage $V_{REF}$, wherein the first resistor module RM_1 and the second resistor module RM_2 may respectively be a resister series up to mega ohm, and its current is microampere. The multiplexer MUX is configured to generate the reference voltage $V_{REF\_VDD}$ to the low-dropout regulator 302 according to the received voltage from the second feedback terminal $VSS_{APR}$.

The voltage regulating circuit 30 further includes a plurality of switches S1-S4, which are selectively conducted to operate the voltage regulating circuit 30 in the following configurations:

a) The switches S1, S2 are configured to turn on or turn off a function of feedback of the first feedback terminal $VDD_{APR}$ of a digital logic circuit DLC of the loading circuit LC;

when the switch S1 is conducted and the switch S2 is turned off, the voltage feedback of the first feedback terminal $VDD_{APR}$ is activated; when the switch S1 is turned off and the switch S2 is conducted, the driving voltage $VDD_{REG}$ is fed back to the low-dropout regulator 302.

b) The switches S3, S4 are configured to turn on or turn off a function of detecting the second feedback terminal $VSS_{APR}$ of a digital logic circuit DLC of the loading circuit LC;

when the switch S3 is conducted and the switch S4 is turned off, the function of detecting the second feedback terminal $VSS_{APR}$ is activated; when the switch S3 is turned off and the switch S4 is conducted, the reference voltage generating circuit 304 detects the second voltage $VSS_{REG}$ of the low-dropout regulator 302.

As illustrated in FIG. 3, since a power path impedance $R_{APR\_PWR}$ and a ground path impedance $R_{APR\_GND}$ cannot be neglected between the low-dropout regulator 302 and the loading circuit LC, an IR drop at the digital logic circuit DLC is generated. In an embodiment, the current $I_{APR}$ is around a hundred of milliampere (mA), while the currents of a power feedback path impedance $R_{DET\_PWR}$ and a ground detect path impedance $R_{DET\_GND}$ are around tens of microampere (μA). Comparing to the loading condition of the power path impedance $R_{APR\_PWR}$ and the ground path impedance $R_{APR\_GND}$, the current loading of the power feedback path impedance $R_{DET\_PWR}$ and the ground detect path impedance $R_{DET\_GND}$ usually can be negligible.

In this condition, a power feedback path is conducted via the switch S1, and a ground detecting path is conducted via the switch S3 to compensate the IR drop of the digital logic circuit DLC. The reference voltage generating circuit 304 is configured to generate a first input voltage $V_{REF}$ on the first resistor module RM_1 according to the first input voltage $V_{REF}$ and a unit gain buffer. The current mirror CM reflects the current of the first resistor module RM_1 to the second resistor module RM_2 according to the first input voltage $V_{REF}$ and then establishes the reference voltage $V_{REF\_VDD}$ according to the multiplexer MUX.

In addition, since the switch S3 is conducted and the switch S4 is turned off, a ground detecting terminal $V_{SEN}$ of the second resistor module RM_2 is connected to the second feedback terminal $VSS_{APR}$. Assume $I_{GND} \approx I_{APR}$, a raised voltage $\Delta V_1 = I_{GND} * R_{APR\_GND} \approx I_{APR} * R_{APR\_GND}$ is generated by the ground path impedance $R_{APR\_GND}$. In such a condition, the raised voltage $\Delta V_1$ is sensed at the ground detecting terminal $V_{SEN}$ and is compensated on the reference voltage $V_{REF\_VDD}$ of the reference voltage generating circuit 304, and the raised voltage $\Delta V_1$ is provided to the low-dropout regulator 302 for compensating the raised ground voltage of the digital logic circuit DLC.

In addition, since the switch S1 is conducted and the switch S2 is turned off, the power detecting terminal $V_{FB}$ is connected to the first feedback terminal $VDD_{APR}$ to ensure that the first feedback terminal $VDD_{APR}$ of the digital logic circuit DLC may be locked on the reference voltage $V_{REF\_VDD}$, which is not varied with the digital logic circuit DLC and the power path impedance $R_{APR\_PWR}$ to compensate a dropped voltage $\Delta V_2 = I_{PWR} * R_{APR\_PWR} \approx I_{APR} * R_{APR\_PWR}$ ($I_{PWR} \approx I_{APR}$), wherein the dropped voltage $\Delta V_2$ is generated when the current $I_{APR}$ flows through the power path impedance $R_{APR\_PWR}$.

By detecting the first feedback terminal $VDD_{APR}$ and the second feedback terminal $VSS_{APR}$ of the digital logic circuit DLC, the dropped voltage $\Delta V_2$ and the raised voltage $\Delta V_1$ through the power path impedance $R_{APR\_PWR}$ and the ground path impedance $R_{APR\_GND}$ may be compensated to ensure that a voltage difference $VDD_{DIFF\_MAX}$ is maintained between the first feedback terminal $VDD_{APR}$ and the second feedback terminal $VSS_{APR}$. Therefore, the digital logic circuit DLC may be operated with enough margin with either light loading or heavy loading.

As shown in FIG. 4, in a period T0, the current $I_{APR}$ is around 0 mA when the digital logic circuit DLC is operated without loading, and the voltage difference $VDD_{DIFF\_MAX}$ between the first feedback terminal $VDD_{APR}$ and the second feedback terminal $VSS_{APR}$ is clamped without interference of the power path impedance and the ground path impedance.

In a period T1, when the digital logic circuit DLC starts to draw the current from the voltage regulating circuit 30, the raised voltage $\Delta V_1 = I_{GND} * R_{APR\_GND} \approx I_{APR} * R_{APR\_GND}$ ($I_{GND} \approx I_{APR}$) is generated by the ground path impedance $R_{APR\_GND}$. The raised voltage $\Delta V_1$ is sensed at the ground detecting terminal $V_{SEN}$ and is compensated for the reference voltage $V_{REF\_VDD}$ of the reference voltage generating circuit 304. The raised voltage $\Delta V_1$ is then provided to the low-dropout regulator 302 for compensating the raised voltage $\Delta V_1$ of the digital logic circuit DLC. At the same time, the voltage of the first feedback terminal $VDD_{APR}$ is fed back to the power detecting terminal $V_{FB}$, such that the low-dropout regulator 302 may maintain the voltage difference $VDD_{DIFF\_MAX}$ between the first feedback terminal $VDD_{APR}$ and the second feedback terminal $VSS_{APR}$ to compensate a dropped voltage $\Delta V_2 = I_{PWR} * R_{APR\_PWR} \approx I_{APR} * R_{APR\_PWR}$ ($I_{PWR} \approx I_{APR}$), which is generated when the current $I_{APR}$ flows through the power path impedance $R_{APR\_PWR}$. Therefore, the digital logic circuit DLC may be operated with enough margin with either light loading or heavy loading.

In another embodiment, when power path impedance $R_{APR\_PWR}$ can be neglected and the ground path impedance $R_{APR\_GND}$ cannot be neglected between the low-dropout regulator 302 and the reference voltage generating circuit 304, only the ground path impedance $R_{APR\_GND}$ should be considered for the compensation of the raised voltage $\Delta V_1 \approx I_{APR} * R_{APR\_GND}$ and the power path impedance $R_{APR\_PWR}$ can be neglected in this case.

Figure 5:
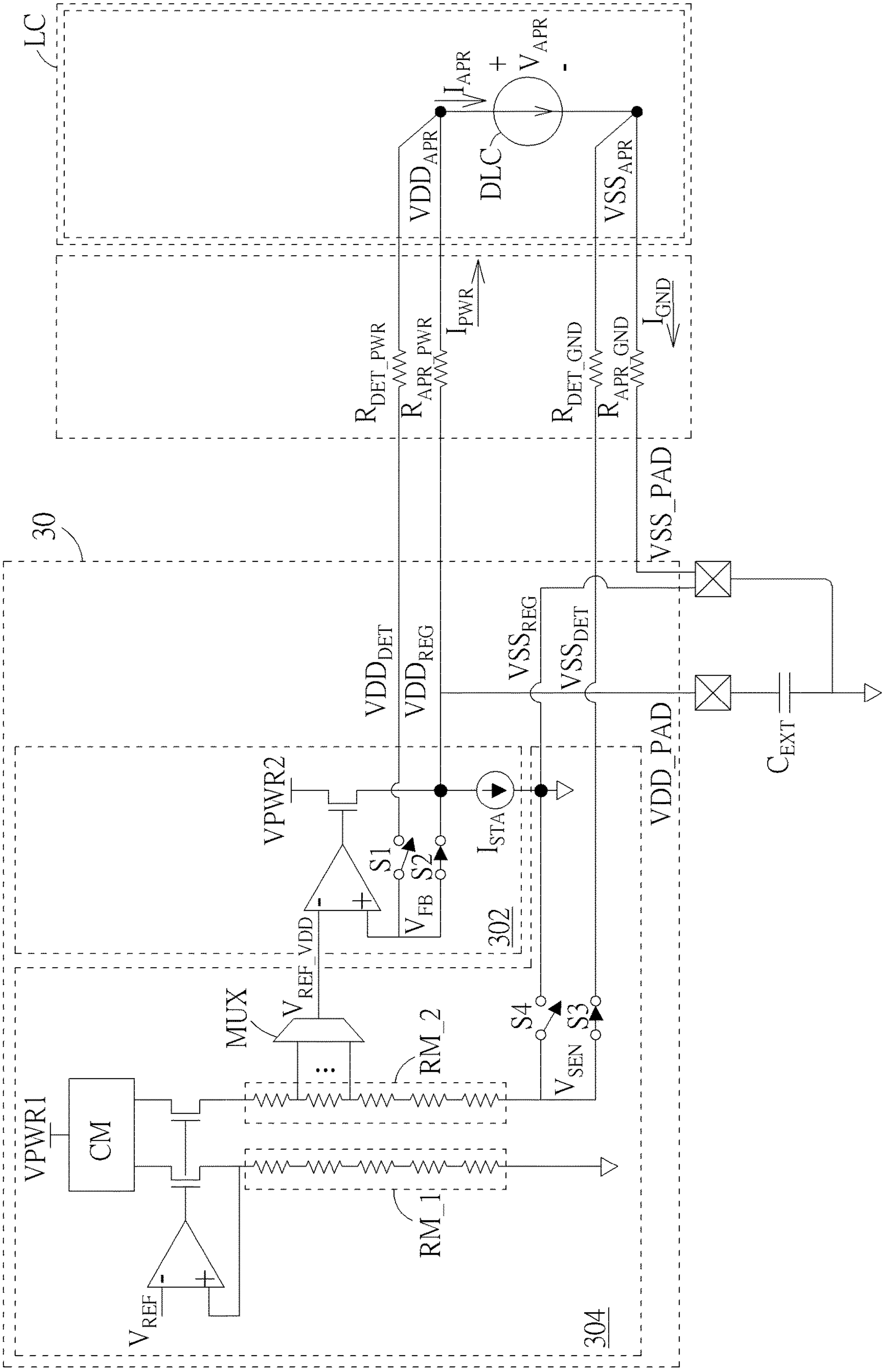
Figure 6:
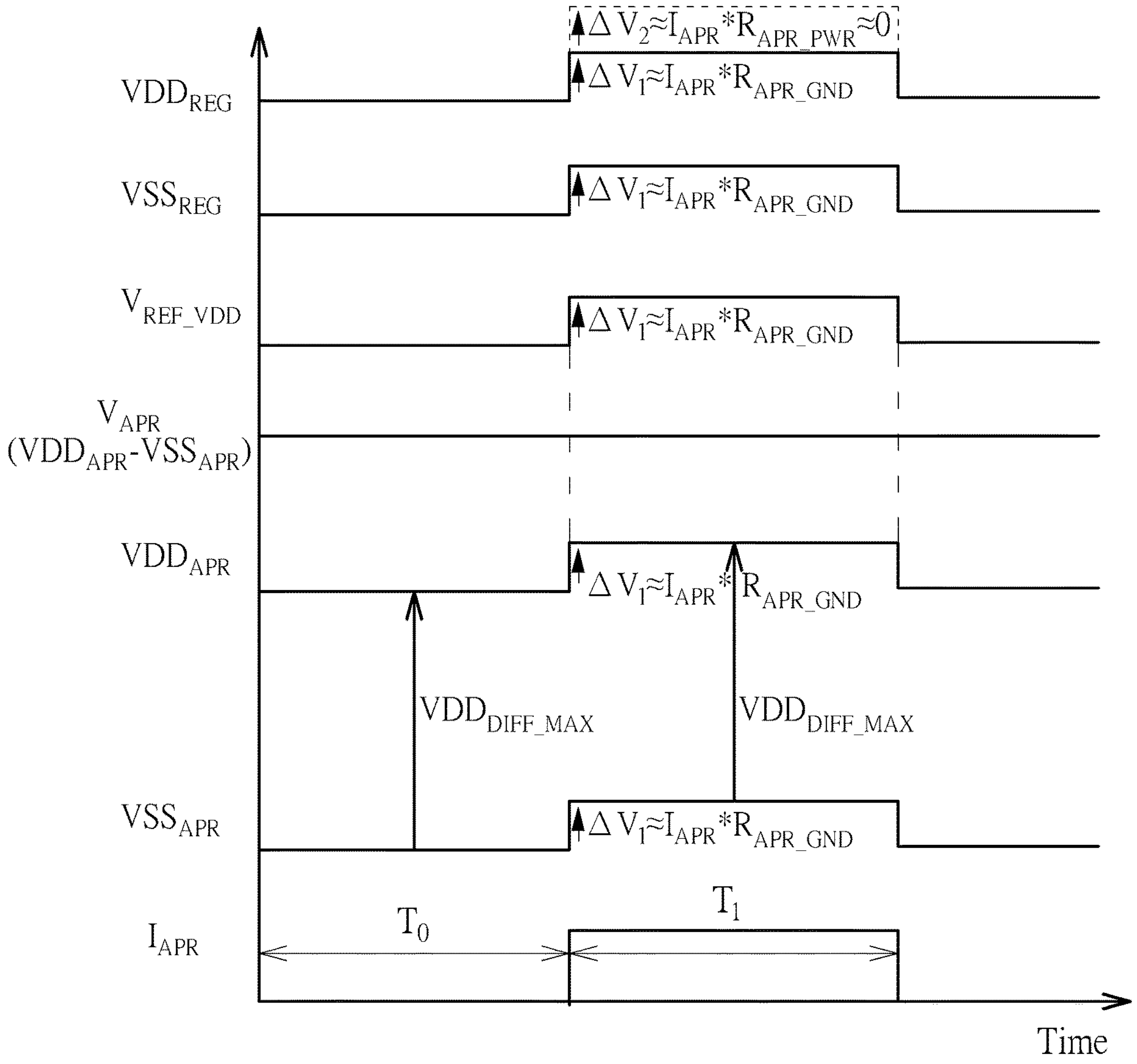

In order to compensate the IR drop of the ground path impedance $R_{APR\_GND}$ the function of detecting the second feedback terminal $VSS_{APR}$ is activated, and the switch S3 is conducted and the switch S4 is turned off, as shown in FIGS. 5 and 6.

In FIG. 5, the switch S1 is turned off and the switch S2 is conducted. That is, the feedback function of the first feedback terminal $VDD_{APR}$ is not activated. In addition, the switch S3 is conducted and the switch S4 is turned off to activate the function of detecting the second detection voltage $VSS_{DET}$ from the second feedback terminal $VSS_{APR}$. The reference voltage generating circuit 304 is configured to generate the first input voltage $V_{REF}$ on the first resistor module RM_1 according to the first input voltage $V_{REF}$ and a unit gain buffer. The current mirror CM reflects currents of the first resistor module RM_1 to the second resistor module RM_2 according to the first input voltage $V_{REF}$ and then establishes the reference voltage $V_{REF\_VDD}$ according to the multiplexer MUX. Since the switch S3 is conducted and the switch S4 is turned off, the ground detecting terminal $V_{SEN}$ of the second resistor module RM_2 is connected to the second feedback terminal $VSS_{APR}$ to detect the second detection voltage $VSS_{DET}$. The raised voltage $\Delta V_1 = I_{GND} * R_{APR\_GND} \approx I_{APR} * R_{APR\_GND}$ is generated by the ground path impedance $R_{APR\_GND}$. In such condition, the raised voltage $\Delta V_1$ is sensed at the ground detecting terminal $V_{SEN}$ and is compensated on the reference voltage $V_{REF\_VDD}$ of the reference voltage generating circuit 304. The raised voltage $\Delta V_1$ is provided to the low-dropout regulator 302 for compensating the raised ground voltage of the digital logic circuit DLC.

Since the switch S1 is turned off and the switch S2 is conducted, the power detecting terminal $V_{FB}$ is connected to the driving voltage $VDD_{REG}$ to keep up with a variation of the reference voltage $V_{REF\_VDD}$. In addition, since the power path impedance $R_{APR\_PWR}$ can be neglected, i.e. $\Delta V_2 = I_{PWR} * R_{APR\_PWR} \approx I_{APR} * R_{APR\_PWR} \approx 0$, the driving voltage $VDD_{REG}$ of the low-dropout regulator 302 would be close to the first feedback terminal $VDD_{APR}$, which ensures that the first feedback terminal $VDD_{APR}$ of the digital logic circuit DLC would not be affected by the current $I_{APR}$.

Therefore, by detecting the second feedback terminal $VSS_{APR}$ of the digital logic circuit DLC, the raised voltage $\Delta V_1$ generated by the current $I_{APR}$ flowing through the ground path impedance $R_{APR\_GND}$ may be compensated to ensure that the clamped voltage between the first feedback terminal $VDD_{APR}$ and the second feedback terminal $VSS_{APR}$ is fixed with either light loading or heavy loading of the digital logic circuit DLC.

FIG. 6 is a schematic diagram of waveforms of the voltage regulating circuit 30 and the digital logic circuit DLC in the configuration of FIG. 5 according to an embodiment of the present invention. In the period T0, the current $I_{APR}$ is around 0 mA when the digital logic circuit DLC is operated without loading, and the voltage difference between the first feedback terminal $VDD_{APR}$ and the second feedback terminal $VSS_{APR}$ of the digital logic circuit DLC is clamped without interference of the power path impedance and the ground path impedance, such that the digital logic circuit DLC may be operated within the voltage difference $VDD_{DIFF\_MAX}$.

In the period T1 of FIG. 6, when the digital logic circuit DLC starts to draw the current $I_{APR}$ from the voltage regulating circuit 30, and the raised voltage $\Delta V_1 \approx I_{APR} * R_{APR\_GND}$ is generated by the current $I_{APR}$ flowing through the ground path impedance $R_{APR\_GND}$. The raised voltage $\Delta V_1$ is sensed at the ground detecting terminal $V_{SEN}$ and the reference voltage $V_{REF\_VDD}$ of the reference voltage generating circuit 304 is raised by the raised voltage $\Delta V_1$, which is provided to the low-dropout regulator 302. The driving voltage $VDD_{REG}$ is fed back to a power detecting terminal $V_{FB}$, such that the driving voltage $VDD_{REG}$ may follow the variation of the reference voltage $V_{REF\_VDD}$.

Since the power path impedance $R_{APR\_PWR}$ can be neglected (i.e. $\Delta V_2 \approx I_{APR} * R_{APR\_PWR} \approx 0$), the voltage drop by the current $I_{APR}$ flowing through the power path impedance $R_{APR\_PWR}$ can be neglected, i.e. a voltage of the first feedback terminal $VDD_{APR}$ is nearly equal to the driving voltage $VDD_{REG}$. Therefore, by detecting the second detection voltage $VSS_{DET}$ from the second feedback terminal $VSS_{APR}$ of the digital logic circuit DLC, the raised voltage $\Delta V_1$ generated by the current $I_{APR}$ flowing through the ground path impedance $R_{APR\_GND}$ may be compensated to ensure that the clamped voltage between the first feedback terminal $VDD_{APR}$ and the second feedback terminal $VSS_{APR}$ is fixed with either light loading or heavy loading of the digital logic circuit DLC.

In another embodiment, when power path impedance $R_{APR\_PWR}$ cannot be neglected and the ground path impedance $R_{APR\_GND}$ can be neglected, only the power path impedance $R_{APR\_PWR}$ should be considered for the compensation of the IR drop, and the ground path impedance $R_{APR\_GND}$ can be neglected in this case.

Figure 7:
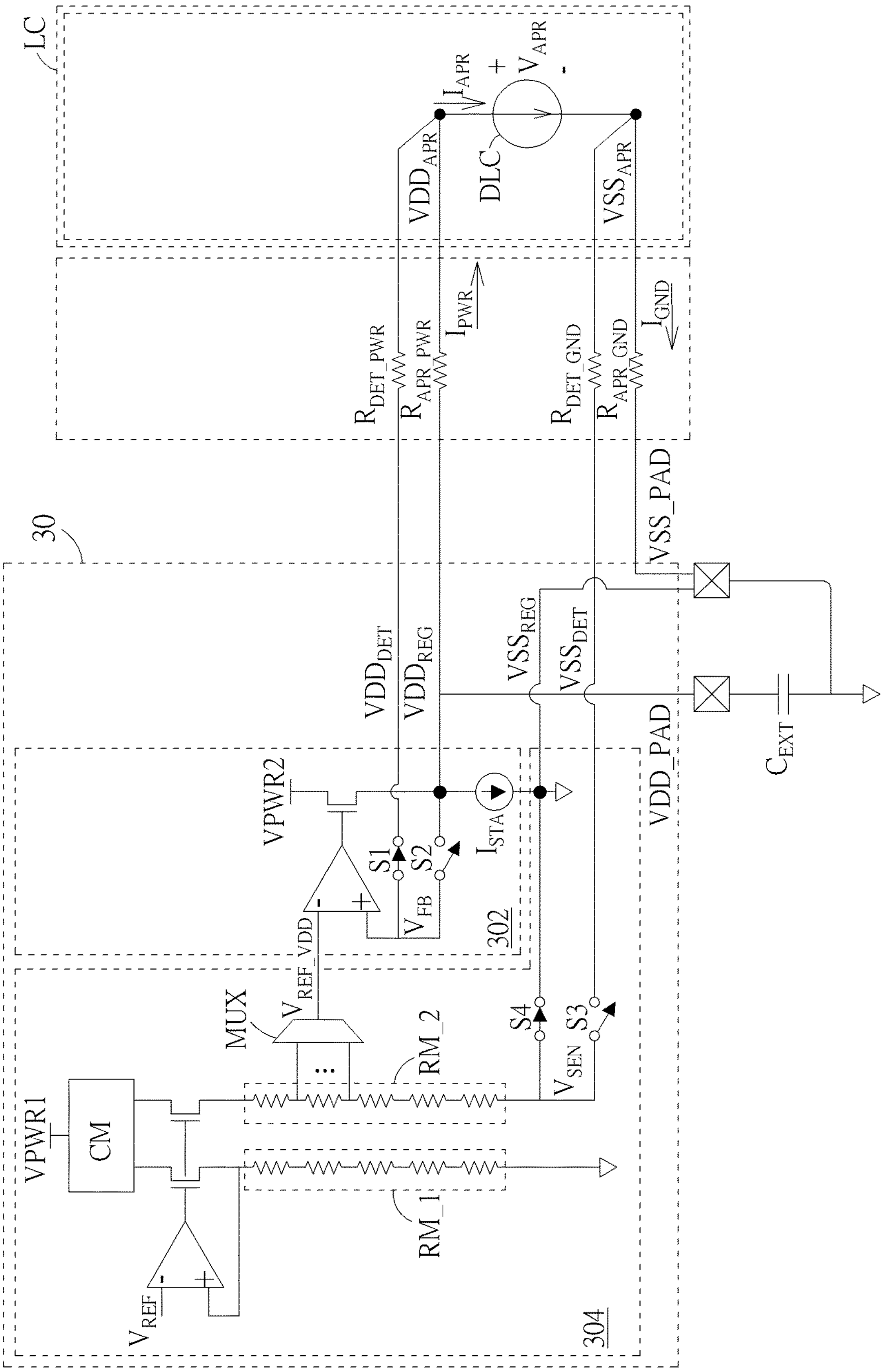
Figure 8:
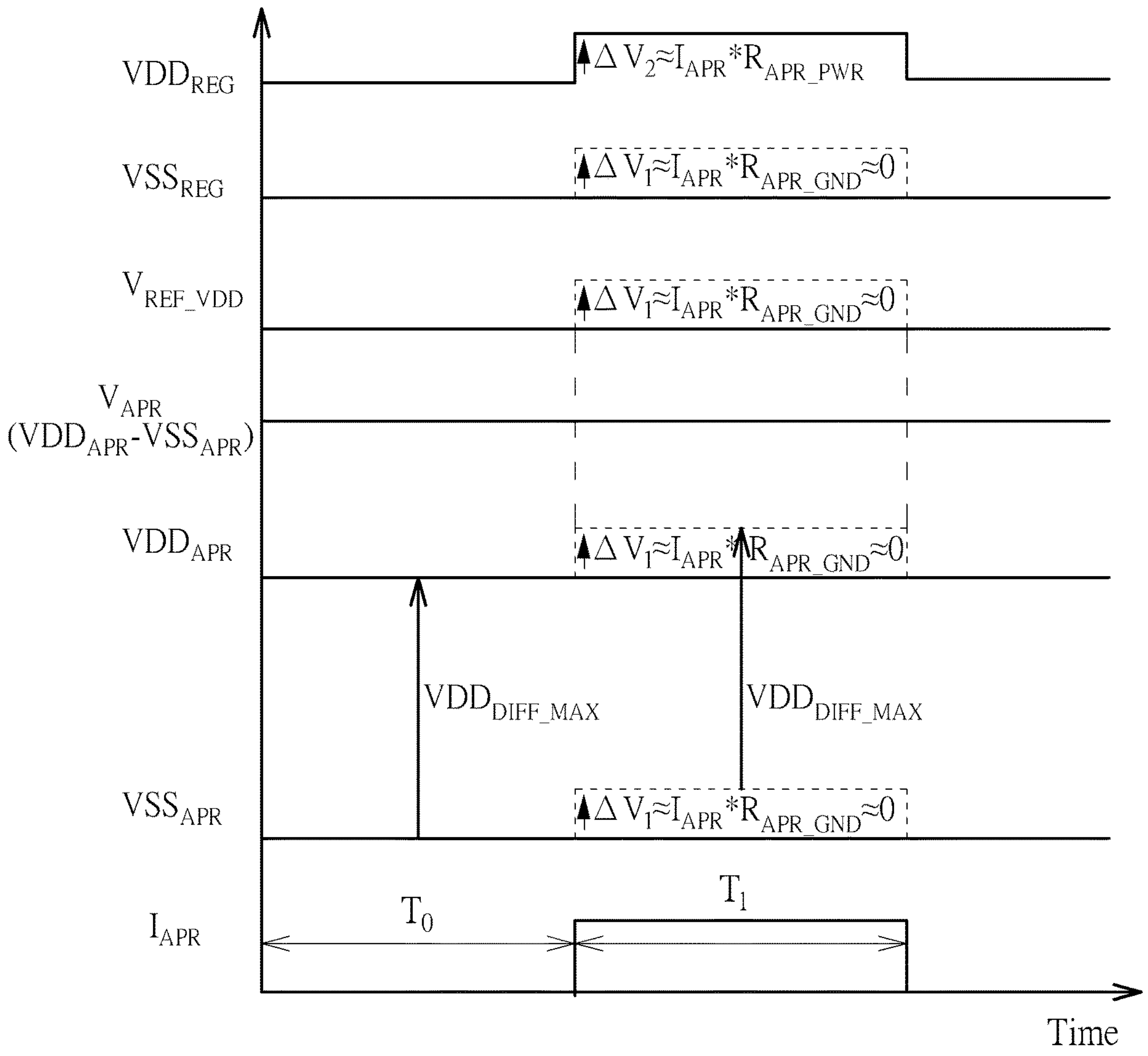

In order to compensate the IR drop of the power path impedance $R_{APR\_PWR}$, the function of feedback of the first feedback terminal $VDD_{APR}$ to the reference voltage $V_{REF\_VDD}$ is activated, and thus the switch S1 is conducted, the switch S2 is turned off; the switch S3 is turned off, the switch S4 is conducted, as shown in FIG. 7 and FIG. 8.

The reference voltage generating circuit 304 is configured to generate the first input voltage $V_{REF}$ on the first resistor module RM_1 according to the first input voltage $V_{REF}$ and a unit gain buffer. The current mirror CM reflects the current of the first resistor module RM_1 to the second resistor module RM_2 according to the first input voltage $V_{REF}$ and then establishes the reference voltage $V_{REF\_VDD}$ according to the multiplexer MUX. Since the switch S3 is turned off and the switch S4 is conducted, the ground detecting terminal $V_{SEN}$ of the second resistor module RM_2 is connected to the second voltage $VSS_{REG}$ and the ground path impedance $R_{APR\_GND}$ can be neglected.

Moreover, since the switch S1 is conducted and the switch S2 is turned off, the power detecting terminal $V_{FB}$ of the low-dropout regulator 302 is connected to the first feedback terminal $VDD_{APR}$ to ensure that the first feedback terminal $VDD_{APR}$ of the digital logic circuit DLC may be locked on the reference voltage $V_{REF\_VDD}$, which is not varied with the digital logic circuit DLC and the power path impedance $R_{APR\_PWR}$, to compensate a dropped voltage $\Delta V_2 = I_{PWR} * R_{APR\_PWR} \approx I_{APR} * R_{APR\_PWR}$ ($I_{PWR} \approx I_{APR}$), which is generated when the current $I_{APR}$ flows through the power path impedance $R_{APR\_PWR}$.

As shown in FIG. 8, in the period T0, the current $I_{APR}$ is around 0 mA when the digital logic circuit DLC is operated without loading, and the voltage difference $VDD_{DIFF\_MAX}$ between the first feedback terminal $VDD_{APR}$ and the second feedback terminal $VSS_{APR}$ is clamped without interference of the power path impedance and the ground path impedance.

In the period T1, when the digital logic circuit DLC starts to draw the current $I_{APR}$ from the voltage regulating circuit 30, since the ground path impedance $R_{APR\_GND}$ can be neglected, the raised voltage $\Delta V_1$ of the current $I_{APR}$ flows through the ground path impedance $R_{APR\_GND}$ can be neglected.

Since the ground detecting terminal $V_{SEN}$ of the second resistor module RM_2 detects that the second voltage $VSS_{REG}$ is nearly equal to the voltage of the second feedback terminal $VSS_{APR}$, the ground path impedance $R_{APR\_GND}$ can be neglected and the raised voltage $\Delta V_1$ on the reference voltage $V_{REF\_VDD}$ can be neglected.

The low-dropout regulator 302 may adjust the first feedback terminal $VDD_{APR}$ by detecting the first detection voltage $VDD_{DET}$ of the power detecting terminal $V_{FB}$ to compensate the dropped voltage $\Delta V_2$ of the current $I_{APR}$ flowing through the power path impedance $R_{APR\_PWR}$ to ensure that a voltage difference $VDD_{DIFF\_MAX}$ is maintained between the first feedback terminal $VDD_{APR}$ and the second feedback terminal $VSS_{APR}$.

In another embodiment, when both of power path impedance $R_{APR\_PWR}$ and the ground path impedance $R_{APR\_GND}$ can be neglected, the driving voltage $VDD_{REG}$ is fed back to the power detecting terminal $V_{FB}$ and the second voltage $VSS_{REG}$ is detected for ensuring the clamped voltage of the digital logic circuit DLC, i.e. the voltage difference $VDD_{DIFF\_MAX}$, is maintained.

Figure 9:
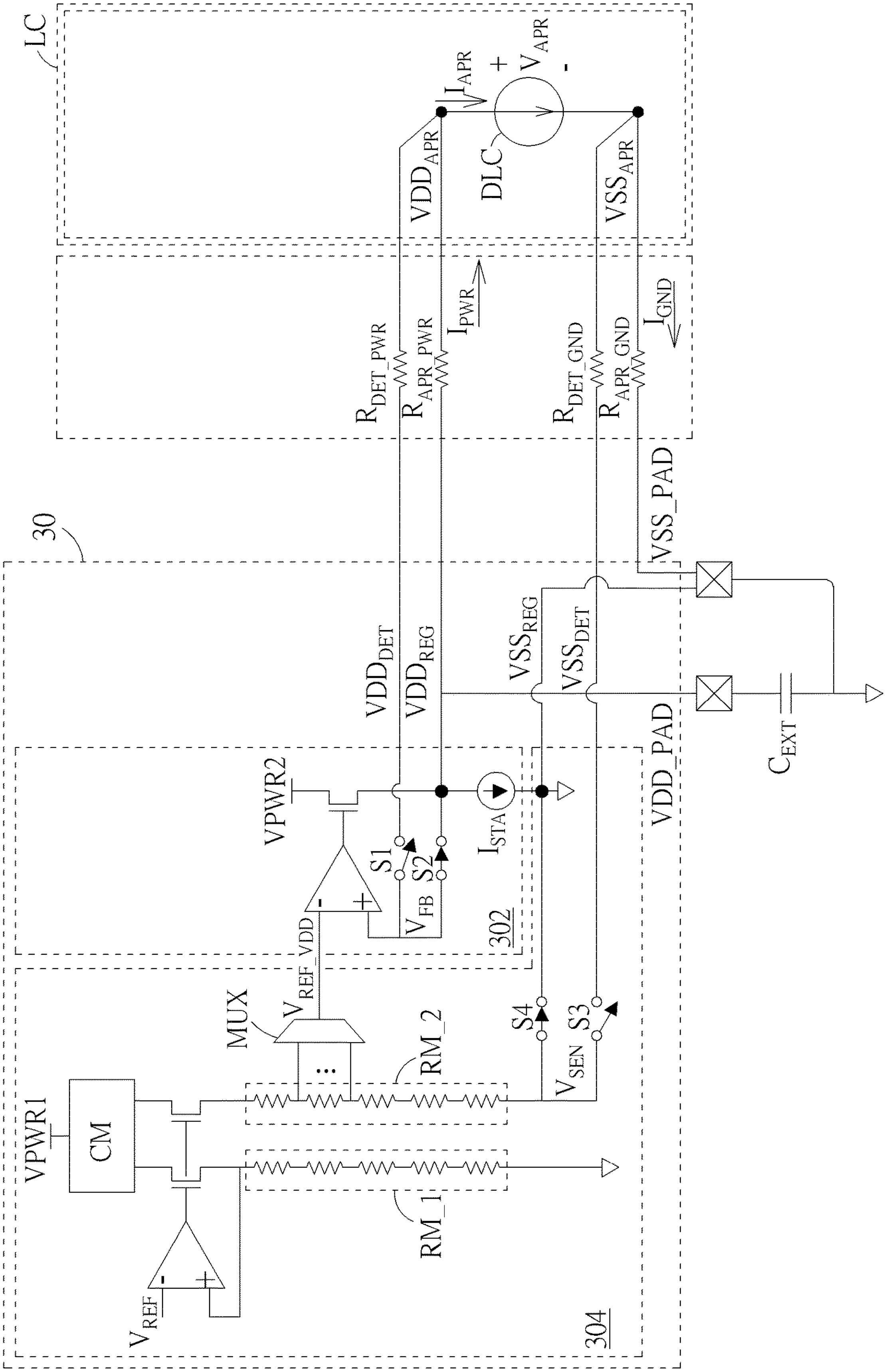

As shown in FIG. 9, the switch S1 turned off and the switch S2 is conducted, the power detecting terminal $V_{FB}$ is connected to the driving voltage $VDD_{REG}$ to keep up with a variation of the reference voltage $V_{REF\_VDD}$; the switch S3 is turned off and the switch S4 is conducted to turn off the function of detecting the second feedback terminal $VSS_{APR}$.

The current mirror CM reflects the current of the first resistor module RM_1 to the second resistor module RM_2 according to the first input voltage $V_{REF}$ and then establishes the reference voltage $V_{REF\_VDD}$ according to the multiplexer MUX. Since the switch S3 is turned off and the switch S4 is conducted, the ground detecting terminal $V_{SEN}$ of the second resistor module RM_2 is connected to the second voltage $VSS_{REG}$ and the ground path impedance $R_{APR\_GND}$ can be neglected, the raised voltage $\Delta V_1 = I_{GND} * R_{APR\_GND} \approx I_{APR} * R_{APR\_GND} \approx 0$, wherein $I_{GND} \approx I_{APR}$, is generated when the current $I_{APR}$ flows through the ground path impedance $R_{APR\_GND}$.

Since the switch S1 is turned off and the switch S2 is conducted, the power detecting terminal $V_{FB}$ is configured to receive the driving voltage $VDD_{REG}$ to keep up with a variation of the reference voltage $V_{REF\_VDD}$. In addition, the power path impedance $R_{APR\_PWR}$ can be neglected, i.e. $\Delta V_2 = I_{PWR} * R_{APR\_PWR} \approx I_{APR} * R_{APR\_PWR} \approx 0$, wherein $I_{PWR} \approx I_{APR}$, the driving voltage $VDD_{REG}$ of the low-dropout regulator 302 is close to the first feedback terminal $VDD_{APR}$, which ensures that the first feedback terminal $VDD_{APR}$ of the digital logic circuit DLC would not be affected by the current $I_{APR}$.

Figure 10:
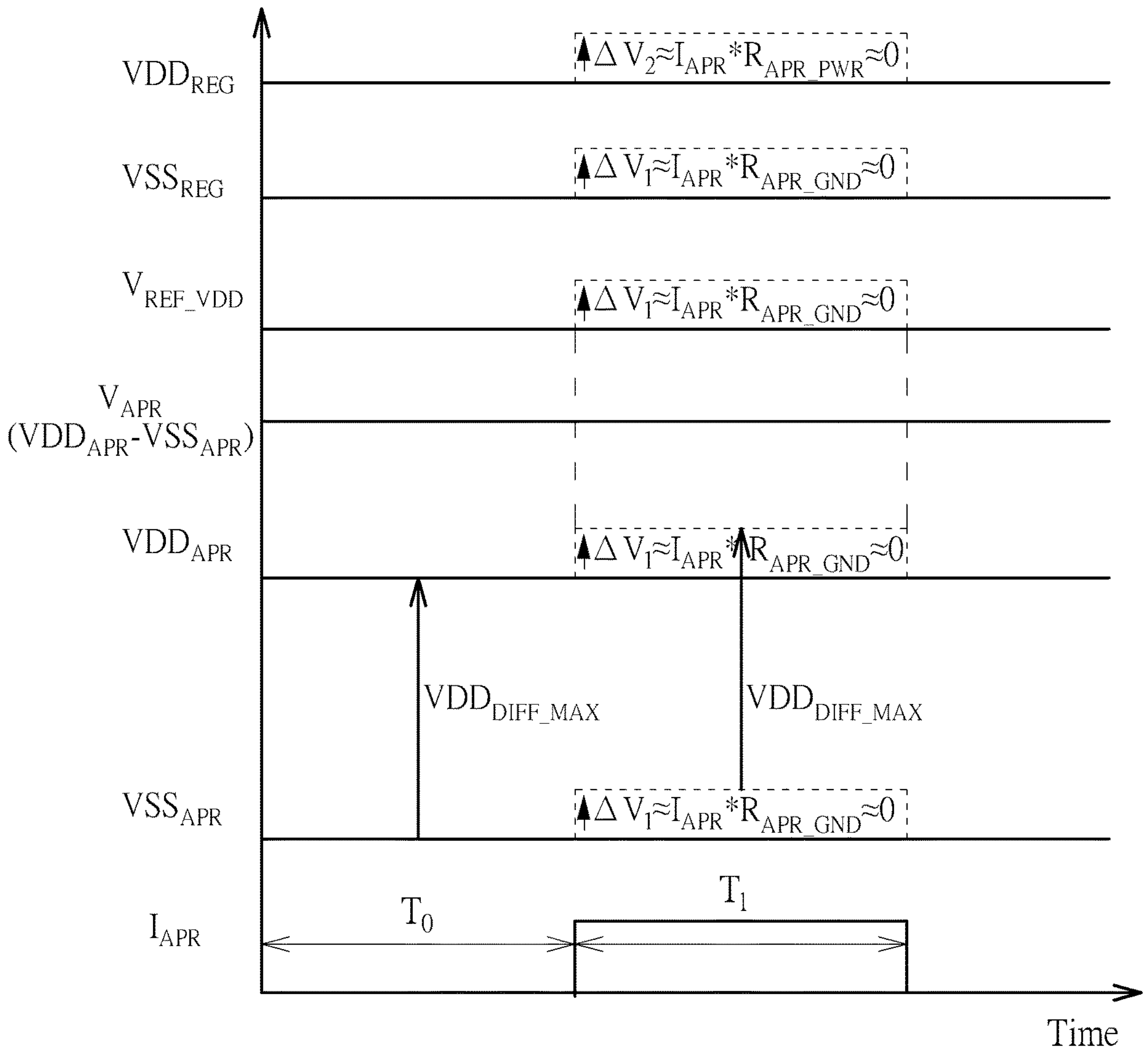

As shown in FIG. 10, in the period T0, the current $I_{APR}$ is around 0 mA when the digital logic circuit DLC is operated without loading, and the voltage difference $VDD_{DIFF\_MAX}$ between the first feedback terminal $VDD_{APR}$ and the second feedback terminal $VSS_{APR}$ is clamped without interference of the power path impedance and the ground path impedance.

In the period T1, when the digital logic circuit DLC starts to draw the current $I_{APR}$ from the voltage regulating circuit 30, since the ground path impedance $R_{APR\_GND}$ can be neglected, the raised voltage $\Delta V_1$ of the current $I_{APR}$ flows through the ground path impedance $R_{APR\_GND}$ can be neglected, and the second feedback terminal $VSS_{APR}$ varies with the second voltage $VSS_{REG}$.

Since the ground detecting terminal $V_{SEN}$ of the second resistor module RM_2 detects that the second voltage $VSS_{REG}$ is nearly equal to the voltage of the second feedback terminal $VSS_{APR}$, and then the reference voltage $V_{REF\_VDD}$ is output to the low-dropout regulator 302. The driving voltage $VDD_{REG}$ is fed back to the power detecting terminal $V_{FB}$ which ensures that the driving voltage $VDD_{REG}$ keeps up with the reference voltage $V_{REF\_VDD}$.

In addition, since the power path impedance $R_{APR\_PWR}$ can be neglected, the dropped voltage $\Delta V_2$ generated by the current $I_{APR}$ flowing through the power path impedance $R_{APR\_PWR}$ can be neglected, and the voltage of the first feedback terminal $VDD_{APR}$ can vary with the driving voltage $VDD_{REG}$.

By detecting the driving voltage $VDD_{REG}$ and the second voltage $VSS_{REG}$, the voltage difference $VDD_{DIFF\_MAX}$ between the first feedback terminal $VDD_{APR}$ and the second feedback terminal $VSS_{APR}$ may be clamped when both of the power path impedance $R_{APR\_PWR}$ and the ground path impedance $R_{APR\_GND}$ can be neglected to ensure with either light loading or heavy loading of the digital logic circuit DLC.

Figure 11:
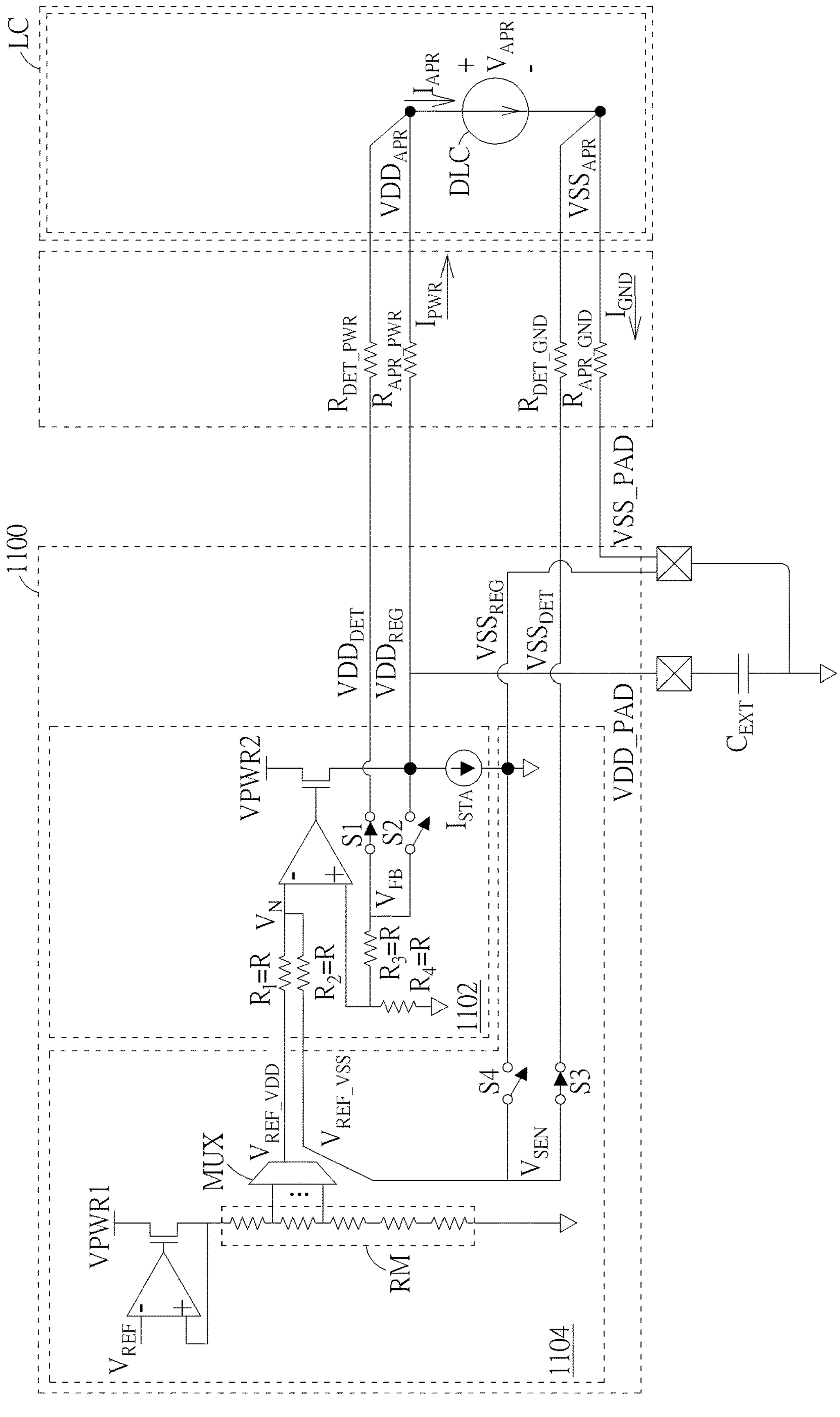
FIG. 11, FIG. 12 are schematic diagrams of a voltage regulating circuit according to another embodiment of the present invention.

Please refer to FIG. 11, which is a schematic diagram of a voltage regulating circuit 1100 according to an embodiment of the present invention. The voltage regulating circuit 1100 includes a low-dropout regulator 1102 and a reference voltage generating circuit 1104. Since FIG. 11 is an embodiment of FIG. 3, element symbols are inherited in FIG. 11. Different from FIG. 3, the reference voltage generating circuit 1104 includes a first resistor module RM and a multiplexer MUX. The multiplexer MUX is configured to generate a reference voltage $V_{REF\_VDD}$ to the low-dropout regulator 1102.

When a power path impedance $R_{APR\_PWR}$ and a ground path impedance $R_{APR\_GND}$ cannot be neglected, an IR drop at a digital logic circuit DLC is generated. In order to compensate the voltage drops caused by the power path impedance $R_{APR\_PWR}$ and the ground path impedance $R_{APR\_GND}$ the feedback function of the first feedback terminal $VDD_{APR}$ and the detecting function of the second feedback terminal $VSS_{APR}$ are activated.

As shown in FIG. 11, when the switch S1 is conducted and the switch S2 is turned off, the function of feedback of the first feedback terminal $VDD_{APR}$ to the reference voltage $V_{REF\_VDD}$ is activated; when the switch S3 is conducted and the switch S4 is turned off the function of detecting the second feedback terminal $VSS_{APR}$ is activated.

The voltage regulating circuit 1100 is configured to determine the reference voltage $V_{REF\_VDD}$ according to a selection of the multiplexer MUX. Since the switch S3 is conducted and the switch S4 is turned off, a ground terminal $V_{REF\_VSS}$ of a ground detecting terminal $V_{SEN}$ is connected to the second feedback terminal $VSS_{APR}$ to receive a second detection voltage $VSS_{DET}$. A raised voltage $\Delta V_1 = I_{GND} * R_{APR\_GND}\ I_{APR} * R_{APR\_GND}$, wherein $I_{GND} \approx I_{APR}$, is generated when a current $I_{APR}$ flow through a ground path impedance $R_{APR\_GND}$, and the raised voltage $\Delta V_1$ is provided to the low-dropout regulator 1102 for compensating the raised ground voltage of the digital logic circuit DLC.

An output voltage $VDD_{REG}$ of the low-dropout regulator 1102 is $[V_{REF\_VDD} * (R_2/(R_1+R_2)) + V_{REF\_VSS} * (R_1/(R_1+R_2))] * (1+R_4/R_3) = V_{REF\_VDD} + \Delta V_1$, wherein $R_1 = R_2 = R_3 = R_4 = R$ and $V_{REF\_VSS} = \Delta V_1$, which can be a compensation for the IR drop of the ground path impedance $R_{APR\_GND}$.

In addition, since the switch S1 is conducted and the switch S2 is turned off, the power detecting terminal $V_{FB}$ is connected to the first feedback terminal $VDD_{APR}$ to receive the first detection voltage $VDD_{DET}$ from the first feedback terminal $VDD_{APR}$, and a dropped voltage $\Delta V_2=I_{PWR}*R_{APR\_PWR}\approx I_{APR}*R_{APR\_PWR}$ (wherein $I_{PWR}\approx I_{APR}$) is generated when the current $I_{APR}$ flows through the power path impedance $R_{APR\_PWR}$.

By detecting the first detection voltage $VDD_{DET}$ from the first feedback terminal $VDD_{APR}$ and the second detection voltage $VSS_{DET}$ from the second feedback terminal $VSS_{APR}$, the raised voltage $\Delta V_1$ and the dropped voltage $\Delta V_2$ generated when the current $I_{APR}$ flows through the power path impedance $R_{APR\_PWR}$ and the ground path impedance $R_{APR\_GND}$ may be compensated to ensure that the digital logic circuit DLC may be operated with enough margin with either light loading or heavy loading.

Regarding the waveforms of the voltage regulating circuit 1100 and the digital logic circuit DLC, please refer to FIG. 4 when the power path impedance $R_{APR\_PWR}$ and a ground path impedance $R_{APR\_GND}$ cannot be neglected. Alternatively, other configurations of the voltage regulating circuit 1100 and corresponding waveforms may be referred to above embodiments of FIG. 3.

Figure 12:
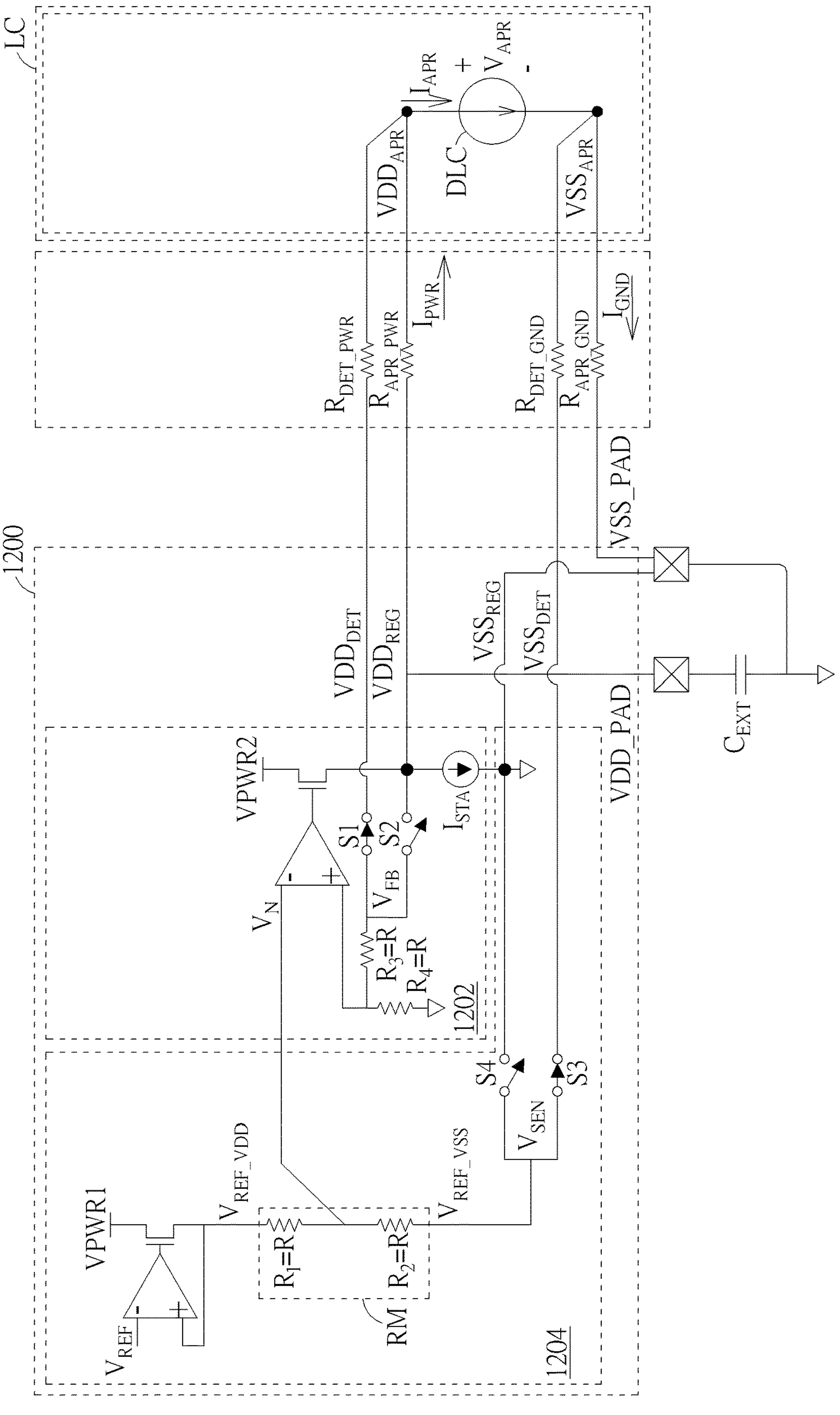

Please refer to FIG. 12, which is a schematic diagram of a voltage regulating circuit 1200 according to an embodiment of the present invention. The voltage regulating circuit 1200 includes a low-dropout regulator 1202 and a reference voltage generating circuit 1204. Since FIG. 12 is an embodiment of FIG. 3, element symbols are inherited in FIG. 12. Different from FIG. 3, the reference voltage generating circuit 1204 includes a first resistor module RM, wherein the first resistor module RM includes a resistor $R_1$ and a resistor R2 in series. The reference voltage generating circuit 1204 is configured to generate an input voltage $V_N$ for the low-dropout regulator 1202 according to a reference voltage $V_{REF}$ and a ground detecting terminal $V_{SEN}$.

When a power path impedance $R_{APR\_PWR}$ and a ground path impedance $R_{APR\_GND}$ cannot be neglected, an IR drop at a digital logic circuit DLC is generated. In order to compensate the voltage drops caused by the power path impedance $R_{APR\_PWR}$ and the ground path impedance $R_{APR\_GND}$, the feedback function of the first feedback terminal $VDD_{APR}$ and the detecting function of the second feedback terminal $VSS_{APR}$ are activated.

As shown in FIG. 12, when the switch S1 is conducted and the switch S2 is turned off, the function of feedback of the first feedback terminal $VDD_{APR}$ to a reference voltage $V_{REF\_VDD}$ is activated; when the switch S3 is conducted and the switch S4 is turned off, the function of detecting the second feedback terminal $VSS_{APR}$ is activated.

The voltage regulating circuit 1200 is configured to generate the reference voltage $V_{REF\_VDD}$ according to a unit gain buffer, the reference voltage $V_{REF\_VDD}$ is connected to a terminal of the resistor $R_1$ of the first resistor module RM, and another terminal of the resistor $R_1$ is coupled to a ground terminal $V_{REF\_VSS}$ via the resistor R2. The input voltage $V_N$ is generated according to a voltage division of the resistors $R_1$ and $R_2$ and then transmitted to the low-dropout regulator 1202.

When the switch S3 is conducted and the switch S4 is turned off, the ground terminal $V_{REF\_VSS}$ is connected to the second feedback terminal $VSS_{APR}$ to receive a second detection voltage $VSS_{DET}$. A raised voltage $\Delta V_1=I_{GND}*R_{APR\_GND}\approx I_{APR}*R_{APR\_GND}$ ($I_{GND}\approx I_{APR}$) is generated when a current $I_{APR}$ flows through the ground path impedance $R_{APR\_GND}$. The second feedback terminal $VSS_{APR}$ is connected to a ground terminal $V_{REF\_VSS}$ of the first resistor module RM. Thus, the input voltage $V_N=V_{REF\_VDD}*(R_2/(R_1+R_2))+V_{REF\_VSS}*(R_1/(R_1+R_2))]$ is provided to the low-dropout regulator 1202 for compensating the raised voltage. An effective output voltage of the low-dropout regulator 1202 is $VDD_{REG}=[V_{REF\_VDD}*(R_2/(R_1+R_2)+V_{REF\_VSS}*(R_1/(R_1+R_2)]*(1+R_4/R_3=V_{REF\_VD}+\Delta V_1$, wherein $R_1=R_2=R_3=R_4=R$, $V_{REF\_VSS}=\Delta V_1)$.

Since the switch S1 is conducted and the switch S2 is turned off, the power voltage terminal $V_{FB}$ of the low-dropout regulator 1202 is connected to the first feedback terminal $VDD_{APR}$ to receive the first detection voltage $VDD_{DET}$ from the first feedback terminal $VDD_{APR}$, a dropped voltage $\Delta V_2\approx I_{PWR}*R_{APR\_PWR}\approx I_{APR}*R_{APR\_PWR}$ ($I_{PWR}\approx I_{APR}$) generated when the current $I_{APR}$ flows through the power path impedance $R_{APR\_PWR}$.

By detecting the first detection voltage $VDD_{DET}$ from the first feedback terminal $VDD_{APR}$ and the second detection voltage $VSS_{DET}$ from the second feedback terminal $VSS_{APR}$, the raised voltage $\Delta V_1$ and the dropped voltage $\Delta V_2$ generated when the current $I_{APR}$ flows through the power path impedance $R_{APR\_PWR}$ and the ground path impedance $R_{APR\_GND}$ may be compensated to ensure that the digital logic circuit DLC may be operated with enough margin with either light loading or heavy loading.

Regarding the waveforms of the voltage regulating circuit 1200 and the digital logic circuit DLC, please refer to FIG. 4 when the power path impedance $R_{APR\_PWR}$ and a ground path impedance $R_{APR\_GND}$ cannot be neglected. Alternatively, other configurations of the voltage regulating circuit 1200 and corresponding waveforms may be referred to above embodiments of FIG. 3.

In summary, the present invention provides a voltage regulating circuit, which compensates a raised voltage and a dropped voltage generated by path impedances between the voltage regulating circuit and a loading circuit to keep enough headroom for operating the loading.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage regulating circuit, comprising:

a low-dropout regulator, configured to provide a driving voltage to drive a loading circuit and receive a first detection voltage from a first feedback terminal; and a reference voltage generating circuit, coupled to the low-dropout regulator, configured to receive a second detection voltage from a second feedback terminal;

wherein a voltage difference between the first feedback terminal and the second feedback terminal is clamped according to the first detection voltage and the second detection voltage.

2. The voltage regulating circuit of claim 1, wherein the reference voltage generating circuit comprises:

a first resistor module and a second resistor module;

a current mirror, coupled to the first resistor module and the second resistor module, configured to reflect the current of the first resistor module to the second resistor module according to a first input voltage; and a multiplexer, coupled to the second resistor module, configured to generate a reference voltage to the low-dropout regulator according to the second detection voltage.

3. The voltage regulating circuit of claim 2, wherein the low-dropout regulator is configured to determine the driving voltage to drive the loading circuit according to a power detecting terminal and the reference voltage.

4. The voltage regulating circuit of claim 1, wherein a voltage of a power detecting terminal is determined according to a power path impedance between the low-dropout regulator and the first feedback terminal.

5. The voltage regulating circuit of claim 4, wherein a power feedback path is conducted to compensate a voltage drop of the power path impedance between the low-dropout regulator and the first feedback terminal.

6. The voltage regulating circuit of claim 1, wherein a voltage of a ground detecting terminal is determined according to a ground path impedance between the reference voltage generating circuit and the second feedback terminal.

7. The voltage regulating circuit of claim 6, wherein a ground detecting path is conducted to compensate a raised voltage of the ground path impedance between the reference voltage generating circuit and the second feedback terminal.

8. The voltage regulating circuit of claim 1, wherein the reference voltage generating circuit comprises:

a first resistor module; and a multiplexer, coupled to the first resistor module, configured to generate a reference voltage to the low-dropout regulator.

9. The voltage regulating circuit of claim 8, wherein the low-dropout regulator is configured to determine the driving voltage to drive the loading circuit and to receive the first detection voltage from the first feedback terminal according to a power detecting terminal and a second input voltage, wherein the second input voltage is determined according to an output of the reference voltage and a ground detecting terminal of the low-dropout regulator.

10. The voltage regulating circuit of claim 9, wherein the second input voltage is between an output of the reference voltage and a voltage of the ground detecting terminal.

11. The voltage regulating circuit of claim 9, wherein a power feedback path between the low-dropout regulator and the first feedback terminal is conducted to compensate a voltage drop of a power path impedance between the low-dropout regulator and the first feedback terminal.

12. The voltage regulating circuit of claim 9, wherein the ground detecting terminal is determined according to a ground path impedance between the reference voltage generating circuit and the second feedback terminal.

13. The voltage regulating circuit of claim 12, wherein a ground detecting path is conducted to compensate a raised voltage of the ground path impedance between the reference voltage generating circuit and the second feedback terminal.

14. The voltage regulating circuit of claim 1, wherein the reference voltage generating circuit comprises:

a first resistor module, coupled to the second feedback terminal and configured to generate an input voltage for the low-dropout regulator according to the reference voltage and a voltage of a ground detecting terminal.

15. The voltage regulating circuit of claim 14, wherein the low-dropout regulator is configured to determine the driving voltage to drive the loading circuit and receive the first detection voltage from the first feedback terminal according to a power detecting terminal and the input voltage.

16. The voltage regulating circuit of claim 14, wherein a power feedback path between the low-dropout regulator and the first feedback terminal is conducted to compensate a voltage drop of a power path impedance between the low-dropout regulator and the first feedback terminal.

17. The voltage regulating circuit of claim 14, wherein the ground detecting terminal is determined according to a ground path impedance between the reference voltage generating circuit and the second feedback terminal.

18. The voltage regulating circuit of claim 17, wherein a ground detecting path is conducted to compensate a raised voltage of the ground path impedance between the reference voltage generating circuit and the second feedback terminal.

* * * * *